United States Patent [19]

Fox

[11] Patent Number: 5,005,357
[45] Date of Patent: Apr. 9, 1991

[54] OSCILLATING FORCE TURBINE

[76] Inventor: Mansel F. Fox, 508 10th St., Edwards AFB, Calif. 93523

[21] Appl. No.: 550,011

[22] Filed: Jul. 9, 1990

[51] Int. Cl.⁵ .............................................. E02B 9/08
[52] U.S. Cl. ...................................... 60/398; 60/495; 60/502; 416/140; 416/147; 416/153
[58] Field of Search ................. 60/495, 496, 497, 502, 60/398; 416/140 R, 147, 153; 290/53

[56] References Cited

U.S. PATENT DOCUMENTS

| | | | |
|---|---|---|---|
| 3,925,986 | 12/1975 | Barwick | 60/398 |
| 4,078,382 | 3/1978 | Ricafranca et al. | 60/398 |
| 4,286,347 | 9/1981 | Modisette | 60/398 |
| 4,383,413 | 5/1983 | Wells | 60/398 X |
| 4,441,316 | 4/1984 | Moody | 60/398 |
| 4,719,754 | 1/1988 | Nishikawa | 60/398 X |

Primary Examiner—Allen M. Ostrager
Attorney, Agent, or Firm—Richard C. Litman

[57] ABSTRACT

A turbine system utilizes the ebb and flow of the natural movements of tidal wave action to generate power. Waves are allowed to enter and exit from a chamber while at the top of the chamber a narrow exit allows for air flow into an out of the chamber is response to the water flow. A turbine placed in line with the air flow has pivoting blades that allows the turbine to rotate in one direction is response to the varying air pressures. This rotating turbine can be used to produce electrical power. An additional feature is an adjustable strike disc that limits the pivoting action of the turbine blades.

4 Claims, 2 Drawing Sheets

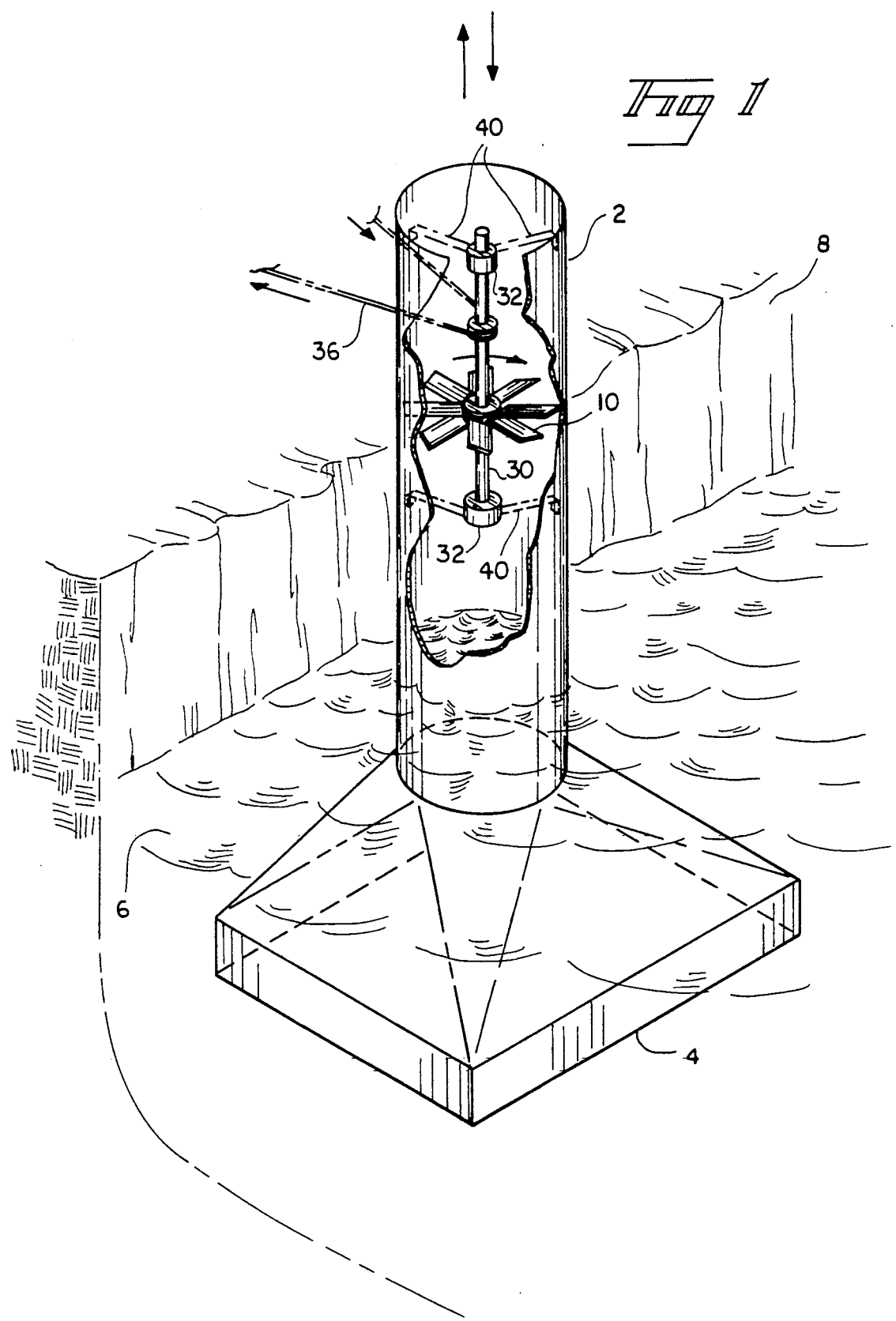

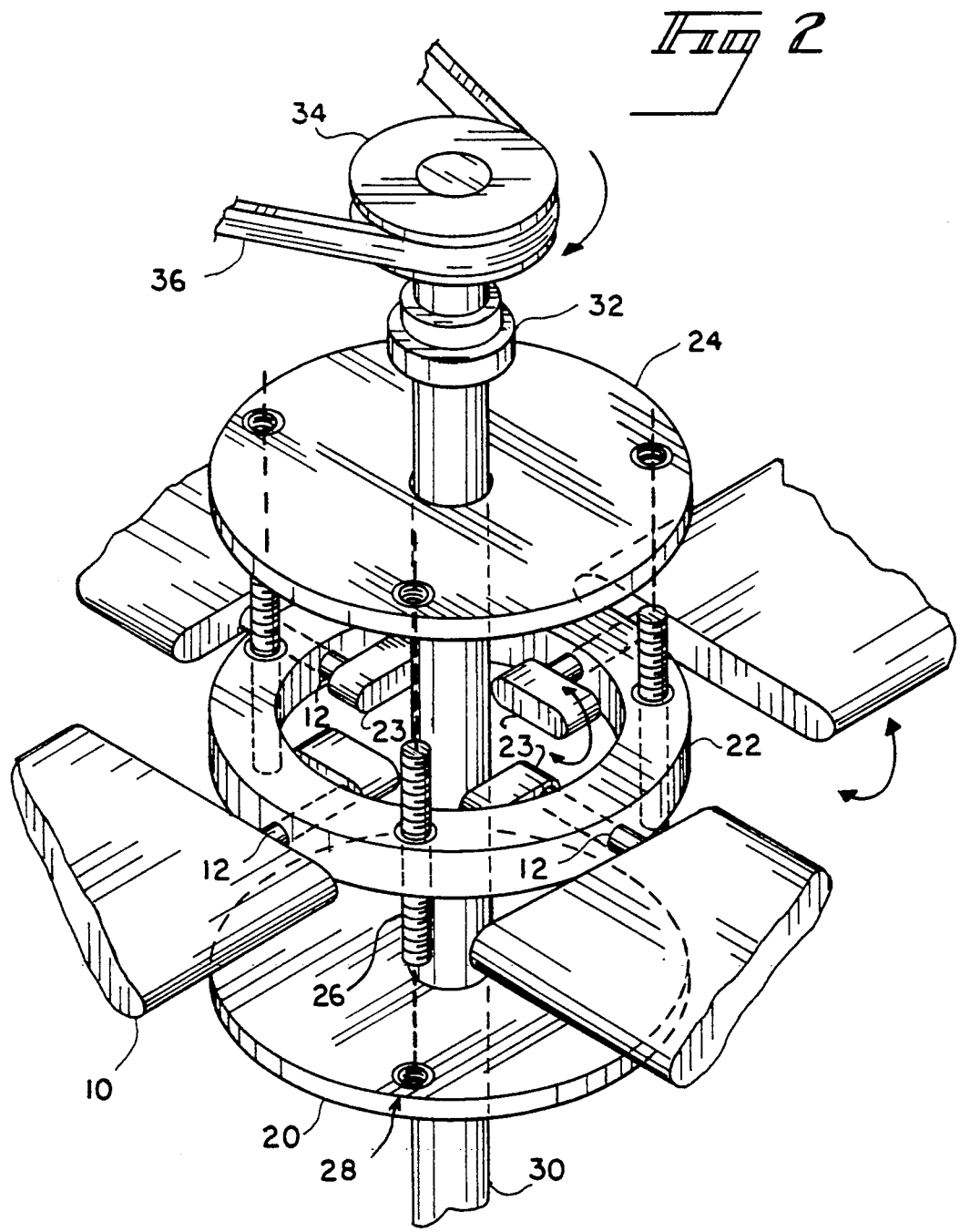

OSCILLATING FORCE TURBINE

BACKGROUND OF THE INVENTION

1. Field of the Invention

The present invention relates to turbine devices having bladed rotors for reacting to fluid flow. More particularly, this turbine makes use of ocean wave energy in order to produce power. The repeated and rhythmic coming and going of ocean swells are utilized to produce variations in air pressure that will drive a bladed rotor on a turbine.

2. Description of the Prior Art

The ocean has long been seen by mankind as a source of energy and numerous devices have been developed to harness this abundant source of natural energy. Some of these devices are listed and described below.

The U.S. Pat. No. 4,083,189 issued to Fetkovich discloses an apparatus for utilizing the energy of ocean waves by applying synchronized alternating air pressure to increase the amplitude of the waves until they spill over the confines of the apparatus and onto the blades of a turbine. This device is actively altering the environment of the seawater by alternating the pressure involved. It would be highly desirable and far simpler to extract energy without having to actively work on the environment.

U.S. Pat. No. 1,768,716 issued to Shishkoff describes a water driven motor is used to drive a friction heater which produces steam. This device interacts directly with the tide or current to produce the power. This is unlike the present invention which utilizes the movement of the ocean to produce variances in air pressure to power a turbine.

U.S. Pat. No. 4,249,383 issued to Molini et al. discloses a method and apparatus of extracting electrical power from sea water due to a temperature difference, which is similar in basic operation to the device disclosed in U.S. Pat. No. 4,083,189 above. This device is able to obtain a higher efficiency due to its recycling nature.

U.S. Pat. No. 4,309,154 used to Daddario describes a means of powering a pump by the rising and falling of water. The continuous run-off from a flowing source is used to operate a pump to redirect water back to a source above a hydroelectric station. This system helps to eliminate the large sized reservoirs need to operate present day hydroelectric stations. Again, it makes direct use of the water itself and not the changes in air pressure that accompany moving water sources.

SUMMARY OF THE INVENTION

Applicant presently discloses a unique means to extract energy from ocean waves. A structure consisting of a chamber and a cylindrical stack are erected along a coastline where waves exist. Wave action causes water to flow in and out of the open end of the chamber, which in turn causes the water level in the stack to move up and down, forcing air to flow in and out of the open end of the stack and past a turbine, which extracts power from the moving air.

If the chamber is near to a substantially vertical wall, the wave amplitude near the wall will be approximately doubled, according to the laws of wave reflection. This will increase the vertical motion of the water in the stack.

The chamber opening is located just below the surface of the ocean, that is, just below an elevation equal to the mean water level minus the wave amplitude. This location yields a greater motion of water, since the displacement of the water as a surface wave passes diminishes with depth.

The motion of the water surface inside the stack is amplified over the motion in the mouth of the chamber by a gradual narrowing of cross-section between the chamber and the stack.

Because of the effects noted above, the rise and fall of the water in the stack will be large.

The mouth of the chamber is rectangular or oblong, with the longer axis running substantially parallel to the shoreline.

The turbine mounted inside the open end of the stack turns as air flows over it, absorbing energy. The turbine blades radiate from a central hub, to which they are engaged by turbine blade shafts passing through the hub. The turbine blades are each axially balanced and free to rotate about an axis concentric with the shaft (change their pitch). The blades are longitudinally balanced by counterweights inside the hub.

Since the blade areas on either side of the blade axis differ, and the blades are balanced, each of the blades will rotate about its axis in response to the pressures exerted by air flow in and out of the stack. This rotation is stopped by the counterweight hitting either an upper or a lower strike plate. The strike plates are above and below the hub. The separation of the plates is controllable by an appropriate mechanism.

The axial rotation of the blades responds to the wind velocity through the stack in such a way that the turbine will be urged to rotate in a single direction, regardless of the in or out direction of air flow.

It is one object of the present invention to provide an oscillating force turbine that has a lower chamber with an entrance for ocean swells and an upper exit that houses the turbine above the sea level.

It is another object of the present invention to provide an oscillating force turbine that utilizes a turbine having pivoting blades that react to the change in air pressure, allowing air flow to exit out the top of the chamber or return into the chamber. The pivoting blades allow the turbine to rotate in a constant direction while reducing drag in between cycles of air flow.

It is a further object of the present invention to provide an oscillating force turbine that makes use of a chamber in which the top portion narrows in order to increase the resultant velocity of the air flow that flows through the turbine.

It is an additional object of the present invention to provide an oscillating force turbine that includes the use of an adjustable strike to limit the amount of pivot in the turbine blades. Two strike plates would be used, one above and one below the turbine blades, a limit the pivot in each direction.

It is also an object of the invention to utilize turbine blades which pivot axially in response to air flow so as to be forced to rotate in a single direction regardless of the direction of air flow perpendicular to the turbine.

These and other objects of the present invention will become readily apparent upon further review of the following specification and drawings.

BRIEF DESCRIPTION OF THE DRAWINGS

FIG. 1 is a perspective view of the wave chamber immersed in the ocean and the position of the turbine shaft and blades inside the stack.

FIG. 2 is a semi-exploded exploded view of the turbine hub, showing parts of the pivoting turbine blades of the turbine and the hub mechanism that carries the blades, including the striking mechanism which limits the pivoting of the blades.

Similar reference characters denote corresponding features consistently throughout the attached drawings.

A DETAILED DESCRIPTION OF THE PREFERRED EMBODIMENT

FIG. 1 shows the stack 2 and chamber 4 with the chamber immersed beneath the ocean surface 6. The stack is fixed to the shore 8 by attachments (not shown). The cutaway of the stack shows the turbine blades 10, shaft 30, power take-off belt 36, shaft bearings 32 and support brackets 40 which fix the shaft to the stack.

The arrows above the stack indicate the up and down motion of the air through the end of the stack.

Preferably, the location of the stack 2 will be such as to maximize the vertical motion of the wave surface 6. Such locations are found on the shores of large lakes and along the shores of oceans. In the United States, a location where large and regular surf is present, such as the coast of California, would be suitable.

The stack 2 could also be erected offshore, in reasonably shallow water, by attaching it to the bottom with steel beams or the like. In very deep water, it could be attached to a large elongated mass immersed vertically in the ocean. Such a mass can have a very long period of up-an-down oscillation, if its cross-section on the water surface is relatively small. If the period is much longer than the period of the waves, it acts as a stable platform. Thus it can resist the forces generated by the reaction of the water against the stack 2 and the turbine blades 10.

The wave motion, and hence also the air motion in the stack, can be amplified over that otherwise available by choosing either a suitable level depth of bottom or a suitable shape of the bottom and/or shore for the location of the invention. A water wave on the surface 6, when reflecting from an obstacle or when entering a region of shallow water, increases in amplitude. This increases the power delivered to the turbine blades 10 in the present invention, and aids efficiency.

Reflection from a cliff such as 8 can double wave amplitude. A gradually decreasing depth of water can increase wave amplitude even more, as is seen at the beach.

Thus, the ideal environment for the present invention is a vertical cliff face at the termination of a bottom ramp of decreasing depth. This will yield a great wave amplitude. The shape cannot be too extreme, however, or the waves will break, causing their energy to be dissipated in turbulence.

FIG. 2 shows the turbine hub assembly with the mechanism which limits the pitch change of the blades. The hub rotates with the power take off shaft 30, which turns on bearings 32 (only the upper bearing is shown in FIG. 2). The hub assembly carries the turbine blades.

The hub assembly consists of hub ring 22, lower strike disc 20 and upper strike disc 24. The ring 22 has an annular cross section (that is, a cross section through a plane lying in the axis of the turbine) which is square or rectangular. Either the upper strike disc 24 or the lower strike disc 20 may be fastened to the shaft 30 to fix the hub assembly as a whole onto the shaft 30 for rotation. For example the upper or the lower disc may be welded or brazed to the shaft.

The three parts of ring, upper strike disc, and lower strike disc are connected by threaded cylindrical worms 26 which are rotatably fixed to the ring 22 at their center points, and screw into threaded holes 28 through the upper and lower strike discs, as discussed below.

The turbine blades 10 are shaped for maximum efficiency in motion and may be narrower at their inner ends than at their outer ends. The blades 10 should be constructed of a material which is of low density, so as to be easily supported by the hub assembly structure.

The turbine blades 10 are rotatably fixed to the hub ring 22 by their shafts 12 which pass through holes, bored radially through the ring, which accept the shafts. The eccentric counterbalances 23 limit the pitch variation of the blades by hitting against the upper strike disc 24 and lower strike disc 20.

The shafts 12 are made of strong material which also, when in contact with the material of the ring 22, has a low coefficient of friction, or, which can be made to have a low coefficient of friction by means of an appropriate lubricant.

The counterbalances 23 should be made of material which is dense, so as to balance the weight of the blades 10, and also hard and strong enough to resist the forces resulting from hitting against the strike discs.

The blades 10 tend to vary pitch, or rotate axially (as shown by the curved arrow on the right of FIG. 2) when air flow in the stack reverses direction. This is because the area of the blade on one side of the shaft axis is greater than on the other. As air impinges upon the blade from the side, the greater force will be exerted upon the side having the larger area. A torque will be exerted about the axis defined by the shaft 12, causing the blade 10 to rotate toward an angle at which the air is deflected toward the side of the blade having the larger area.

Because of this, the air will deflect off the blade toward the side of the blade having the greater area. This deflection of the air will cause a reaction force to be imparted to the blade 10, the reaction force being in the direction of the side of the blade 10 having the smaller area. Thus, the side of the blade with the larger area will be the trailing edge of the blade in operation, regardless of the direction of air flow up or down.

This action is essential to the functioning of the device as shown. It avoids the need for complex, expensive and unreliable means for detecting air motion direction and rotating the blades in response to achieve a single direction of motion of the turbine.

The upper and lower threaded sections of each worm 26 are differentially reverse threaded, in the manner of a turnbuckle, so that axial rotation of any worm causes the threaded holes on the upper and lower strike plates to move together or apart, depending on the sense of rotation.

If the strike plates are parallel, the three worms can be turned simultaneously to move the plates farther or closer to each other while maintaining them parallel. This action is used to adjust the pitch limit of the blades by means of the counterbalances 23 hitting the strike plates.

The worms can be turned individually in small increments with simple hand tools, or, the worms can be turned simultaneously by a suitable mechanism. For example, chain drive sprockets can be welded to the worms near the ring, and a chain passed around these sprockets for simultaneous turning of the worms. The drive could also be automated. Alternatively, each of the worms could be attached to a stepper motor, either directly or through a suitable gear drive, and the stepper motors electrically connected to a control and power circuit.

It is to be understood that the present invention is not limited to the stole embodiment described above, but encompasses any and all embodiments within the scope of the following claims.

I claim:

1. An apparatus for extracting energy from water waves along a shoreline, comprising:
   a cylindrical stack, vertically aligned, said stack having an upper end open and immersed in air, a lower end open and immersed in water;
   an air turbine disposed within said stack, the axis of said turbine being concentric with the axis of said stack, said turbine including
   a hub rotatably mounted within said stack, the axis of said hub being concentric with the axis of said stack,
   a plurality of essentially planar blades rotatably fixed to said hub, the axis of relative rotation between said hub and said blade being perpendicular to the axis of said turbine,
   each of said essentially planar blades being divided into a greater area on a first side of the axis of relative rotation between said blade and said hub, and a lesser area on a second side of the axis of relative rotation between said blade and said hub, and
   means for limiting the rotation of said blades relative to said hub; and
   means for transferring energy from the turbine: whereby
   the energy of waves on the water surface causes air within the stack to flow over the turbine, the flow of air over said turbine causes it to revolve in a single sense regardless of the direction of the flow of air, and wave energy is transferred through said turbine.

2. An apparatus according to claim 1, wherein the lower end of said stack is connected with a chamber having an open lower end of area greater than area of said stack.

3. An apparatus according to claim 1, wherein:
   said hub further comprises a ring, a lower disc disposed coaxially below said ring, an upper disc disposed coaxially above said ring, and at least three cylindrical threaded worms engaging reciprocally threaded holes in said upper disc and in said lower disc, said worms being rotatably fixed at their midpoints to said ring, whereby
   said upper disc and said lower disc are adjustably fixed parallel to and coaxial with said ring; and
   each of said blades further comprises a cylindrical shaft having an inner end and an outer end, an airfoil section fixed to said outer end of said shaft, and an oblong counterbalance fixed eccentrically to said inner end of said shaft, said shaft rotatably engaging radial holes bores through said ring, whereby
   said counterbalance hits against said upper disc and said lower disc upon rotation of said shaft, limiting pitch variation of said airfoil section of said blade.

4. An apparatus according to claim 3, wherein the lower end of said stack is connected with a chamber having an open lower end of area greater than area of said stack.

* * * * *